(12) United States Patent
Spychalski-Merle (10) Patent No.: US 11,548,071 B2
(45) Date of Patent: Jan. 10, 2023

(54) PEELING APPARATUS

(71) Applicant: PF-Schweisstechnologie GmbH, Alsfeld (DE)

(72) Inventor: Achim Spychalski-Merle, Alsfeld (DE)

(73) Assignee: PF-SCHWEISSTECHNOLOGIE GMBH, Alsfeld (DE)

(\*) Notice: Subject to any disclaimer, the term of this patent is extended or adjusted under 35 U.S.C. 154(b) by 565 days.

(21) Appl. No.: 16/431,009

(22) Filed: Jun. 4, 2019

(65) Prior Publication Data
US 2019/0381573 A1 Dec. 19, 2019

(30) Foreign Application Priority Data

Jun. 15, 2018 (DE) .......................... 202018103392.1

(51) Int. Cl.
*B23B 5/16* (2006.01)
*B23B 5/12* (2006.01)

(52) U.S. Cl.
CPC . *B23B 5/12* (2013.01); *B23B 5/16* (2013.01)

(58) Field of Classification Search
CPC . F16L 55/18; F16L 1/06; B26D 3/166; B26D 3/282; B26D 3/169; B23B 5/12; B23B 5/16; B23Q 1/76; B23D 9/00
See application file for complete search history.

(56) References Cited

U.S. PATENT DOCUMENTS

| | | | | |
|---|---|---|---|---|
| 2,716,280 A * | 8/1955 | Ruhe | .................. | B23D 21/08 30/100 |
| 3,112,506 A * | 12/1963 | Kane | .................. | B25B 27/12 15/104.012 |
| 3,651,569 A * | 3/1972 | Arnot | .................. | B23D 21/08 30/95 |
| 3,807,047 A * | 4/1974 | Sherer | .................. | B23D 21/04 30/97 |
| 4,079,477 A * | 3/1978 | Helt | .................. | B23B 3/24 15/104.012 |
| 4,490,909 A * | 1/1985 | Wachs | .................. | B23D 21/04 266/56 |

(Continued)

FOREIGN PATENT DOCUMENTS

| | | |
|---|---|---|
| DE | 100 27 316 A1 | 12/2001 |
| EP | 1 160 035 A1 | 12/2001 |
| WO | WO-2012055822 A1 * 5/2012 | ............... B26D 3/02 |

*Primary Examiner* — Sara Addisu
(74) *Attorney, Agent, or Firm* — Seed IP Law Group LLP (57) ABSTRACT

A peeling apparatus for at least partially removing an external circumferential surface of an approximately cylindrical body is provided. The peeling apparatus includes: a C-shaped or C-like shaped base body, which has two free ends to form a peripheral opening, the cylindrical body being insertable between the two free ends and positionable concentrically in relation to a center of an incircle defined by the internal face of the base body; at least one external bearing mounted on an external axis positioned at each of the free ends, the external bearing abutting the cylindrical body when the body is positioned concentrically in relation to the center of the incircle; at least one central bearing attached to or positioned on the base body, spaced apart from the free ends and on a central axis; and a blade holder into which a blade is insertable so that the blade extends beyond the incircle.

18 Claims, 9 Drawing Sheets

(56) References Cited

U.S. PATENT DOCUMENTS

| | | | | |
|---|---|---|---|---|
| 4,546,681 A * | 10/1985 | Owsen | B23Q 1/76 | 294/116 |
| 4,625,464 A * | 12/1986 | Kubo | B23D 45/006 | 30/92 |
| 4,663,794 A * | 5/1987 | Evans | B29C 66/02245 | 15/104.04 |
| 4,682,919 A * | 7/1987 | Mitchell | B23D 21/04 | 30/97 |
| 4,763,413 A * | 8/1988 | Rothenberger | B23D 21/08 | 30/100 |
| 5,206,996 A * | 5/1993 | McDaniel | B23D 21/08 | 30/101 |
| 5,261,301 A * | 11/1993 | Babb | B23D 21/00 | 82/70.1 |
| 5,282,403 A * | 2/1994 | Rouleau | B23B 31/1269 | 82/127 |
| 5,475,924 A * | 12/1995 | McDaniel | B23D 21/08 | 30/102 |
| 5,596,914 A * | 1/1997 | Liao | B23D 21/04 | 53/442 |
| 6,141,876 A * | 11/2000 | Hamm | B23D 21/06 | 30/100 |
| 6,458,022 B1 * | 10/2002 | Folz | B23Q 1/76 | 269/196 |
| 6,968,762 B1 * | 11/2005 | Muckle | B23D 21/10 | 257/E23.088 |
| 8,813,616 B2 * | 8/2014 | Hangleiter | B23Q 1/76 | 82/157 |
| 2002/0029668 A1 * | 3/2002 | Kroisandt | B23Q 1/0036 | 82/53 |
| 2004/0011169 A1 * | 1/2004 | Marshall | B26D 3/166 | 83/13 |
| 2009/0001643 A1 * | 1/2009 | Rehm | B23Q 11/10 | 269/55 |
| 2014/0026731 A1 * | 1/2014 | Pierce | B26D 3/16 | 83/744 |
| 2014/0190322 A1 * | 7/2014 | Pierce | B23B 5/08 | 82/70.2 |
| 2015/0020656 A1 * | 1/2015 | Huang | B23Q 1/76 | 82/164 |
| 2015/0090094 A1 * | 4/2015 | Arkwright | B26D 3/166 | 83/870 |
| 2015/0122092 A1 * | 5/2015 | Tsai | B23Q 1/76 | 82/170 |
| 2015/0306682 A1 * | 10/2015 | Merle | B24B 9/007 | 82/113 |
| 2015/0321303 A1 * | 11/2015 | Esser | B23Q 1/76 | 82/164 |

* cited by examiner

PEELING APPARATUS

BACKGROUND

Technical Field

The present disclosure relates to a peeling apparatus for at least partially removing an external circumferential surface of an at least approximately cylindrical body.

More particularly, the present disclosure relates to a mono-dimensional peeling apparatus for at least partially removing an external circumferential surface of an at least approximately cylindrical body, in particular a cylindrical plastic tube, with a C-shaped or C-like shaped base body characterized by two free ends at the base body for forming a peripheral opening thereon, the cylindrical body being insertable between the two free ends and being positionable concentrically relative to a center of an incircle predetermined by an internal face of the base body.

Description of the Related Art

In practice, it is known to subject rotationally symmetrical bodies or objects, such as cylindrical plastic tubes, which are to be connected at their ends or with other moldings, for example T or cross pieces for example using heating coil fittings by heating coil welding, to a special treatment in order to achieve a secure and/or media-tight connection. Media such as water or gases may be transported in such plastic tubes. To produce a corresponding transport network, several plastic tubes are connected via sleeves or fittings by means of welding or gluing.

It is also known from practice to create branches for inlets or outlets into existing pipelines by placing so-called saddle pieces on the tube. In such cases as well, the tube surface on which the saddle piece is to be welded or glued has to be pre-treated. In addition to cleaning the surface, it is particularly important to remove the oxide layer present on the surface and to create a planar face free of scratches and grooves, since these might have a negative influence on the quality of the welding or gluing and therefore the durability and tightness of the connecting seam.

Since saddle pieces are usually not placed at the beginning of the tube but rather at a distance therefrom on the surface, peeling apparatuses such as the one described in the patent application DE 100 27 316 are known. In this peeling apparatus, rollers are combined to form a bearing shell, into which the tube that is to be peeled is inserted. Opposite the bearing shell, a peeling knife is arranged that can be manually moved along a spindle toward the tube lying in the bearing shell. When the peeling knife abuts the tube, the peeling apparatus is rotated around the longitudinal axis of the tube.

EP patent application 1 160 035 likewise shows a compact peeling apparatus for peeling a tube or cable. This apparatus has a ring, which has a substantially C-shaped form and thus forms a peripheral opening, through which the cable or tube can be laterally introduced into the ring. The C-shaped ring surrounds the cable or tube over more than 180 degrees, which allows for slack-free circular guidance of the peeling tool around the cable or tube. To introduce the cable or tube, the ring is elastically deformed and temporarily expanded so that the cable or tube can be introduced transversally to its axis into the center of the ring. For fixing the position of the cable or tube, the peeling tool provides a bearing plate exerting mechanical pressure onto the cable or tube. However, this requires an additional adjusting mechanism, which increases the complexity of the peeling tool assembly. Furthermore, the advancement of this peeling apparatus along the longitudinal axis of the tube or cable that is to be processed is more difficult due to a rigid assembly along that direction.

BRIEF SUMMARY

Embodiments of the present invention provide a peeling apparatus which overcomes the above-mentioned disadvantages, allows for a reliable, simple coupling between the peeling apparatus and the cylindrical body, and offers facilitated advancement.

In one advantageous embodiment, a peeling apparatus is provided in which a central axis and/or one or both outer axes is/are pivotably mounted tangentially around a predetermined angle in relation to the incircle. This facilitates advancing of the peeling apparatus along the longitudinal axis of the cylindrical body. Given the pivotability of the axes, the user even then achieves an advancement of the peeling apparatus when the user does not perform a full rotation around the cylindrical body.

Preferably, the central axis is mounted pivotably around a predetermined angle in a passage opening of the base body tangentially—but offset—in relation to the incircle. Alternatively or additionally, one or both of the external axes can be mounted pivotably around a predetermined angle in passage openings of the base body tangentially—but offset—in relation to the incircle. In some instances, the predetermined angle is between 0.5 and 3 degrees, and in some instances, about 1 degree.

The incircle has to be understood as a fictitious component of the peeling apparatus that is substantially predetermined by the shape of the internal face of the base body of the peeling apparatus when the base body is not subject to any elastic deformation. Such elastic deformation can, for example, occur when a cylindrical body is introduced into or located in the center of the C-shaped or C-like shaped base body. The incircle may also be of an only approximately circular shape. This means that it is sufficient if the incircle has an approximately consistent radius around its circumference.

At least one recess may be provided at the base body which results in a reduction of a defined value of the (bending) stiffness of the base body. This means that the cylindrical body can be fed more easily through the opening, therefore between the two free ends, wherein the base body is being elastically deformed. The base body returns to its substantially undeformed configuration once the cylindrical body is positioned concentrically to the central point of the incircle. It is also possible for the base body, due to its elasticity, to determine or set the bias of the introduced cylindrical body.

Advantageously, the free ends at the base body may be configured such that the base body encloses the cylindrical body or the incircle over an angle of more than 180 degrees. This ensures that the peeling apparatus can be positioned securely on the cylindrical body and is not unintentionally separated from the cylindrical body or the plastic tube.

In order to facilitate feeding a cylindrical body into or through the peripheral opening, practice has shown it to be sensible for the external bearings to be formed of at least one external roller that is rotatably mounted on the external axis.

Preferably, however, the external bearings are formed by one pair of external rollers.

When using one or more pairs of external rollers, the peeling apparatus can be kept compact by rotatably mounting the first external roller laterally next to the first lateral face of the base body and by rotatably mounting a second external roller laterally next to a second lateral face of the base body that is parallel to the first lateral face.

In a particularly advantageous embodiment of a peeling apparatus, the external rollers extend beyond the ends of the base body. This ensures that a plastic tube or a cylindrical object or cylindrical body that is to be introduced will come first into contact with the external bearing that is made from the elastically resilient material of the external rollers. This protects the outer skin or external surface of the cylindrical body. When applying the peeling apparatus, the elasticity of the external bearings prevents damage to the plastic tube that could result in a localized weakening of the plastic tube under certain circumstances.

An even three-point hold of the cylindrical body can be achieved by configuring or arranging the central bearing so that it is equidistant from the free ends of the base body.

In an advantageous arrangement, the central bearing is configured as a pair of central rollers that are rotatably mounted on a central axis mounted in the passage opening of the base body. By configuring the central bearing as a pair of central rollers, the friction between the central bearing and the cylindrical body is reduced, so that less force is required to process the external circumferential surface of the cylindrical body with a blade of the peeling apparatus. Alternatively, the central bearing can also be characterized by a single central roller that is rotatably mounted on a central axis.

When using one pair of central rollers, the peeling apparatus can be kept compact by rotatably mounting the first central roller laterally next to the first lateral face of the base body and by rotatably mounting a second central roller laterally next to a second lateral face of the base body that is parallel to the first lateral face.

In order to reduce friction between the central rollers and the cylindrical body, it was shown to be preferential for the central rollers to have a tapering or conical diameter on their side that is facing away from the base body.

In another advantageous embodiment, the central axis and/or one or both of the two external axes are moveable between a pivoted position corresponding to advancing of the peeling apparatus and an unpivoted position corresponding to the return of the peeling apparatus to its starting position. The pivoted position of the central axis and/or the external axes is an orientation of the axes where their longitudinal axis orientated tangentially—offset—in relation to the incircle but is skewed in relation to the longitudinal axis of the cylindrical body. In contrast, the unpivoted position is a configuration of the longitudinal axes where these are parallel to the longitudinal axes of the cylindrical body. In other words, the one or more axes are rotated around the angle during advancing and are returned to their straight position upon the return movement. This means that a user does not have to peel an entire rotation and can still achieve advancement along the longitudinal axis of the cylindrical body.

A simple adjustment of the central axis can also be achieved by positioning a guided ring with a section of stops on the external face and/or a lateral face of the base body that is capable of limited movement in relation to the base body. Here, the central axis can be moved between the pivoted and unpivoted position using these stops.

For example, the ring can have an L-shaped or U-shaped cross-section, which increases the stability and the guiding accuracy of the ring. It may extend only partially or completely over the entire external face of the base body. When the ring extends completely over the entire external face of the base body, the user is protected against jamming hands or fingers during the relative movement of the ring relative to the base body.

Advantageously, the ring may be secured with screws that are screwed into the external face of the base body, for which the ring has oblong holes along which the head of the screw that is fixed into the base body can slide and which allows for—limited—relative movement between the ring and the base body.

Additionally, a bearing section with a recess, through which the respective external axis passes, can be provided or formed at one or both free ends of the ring. Again, the dimensions of the recess are selected such that a relative movement between the ring and the base body is ensured and possible; therefore, the clearance that exists between the external axis and the recess ensures that the relative movement of base body and ring is not blocked. But the bearing sections can also be configured analogously to that section of the ring through which the central axis passes. In this configuration, the bearing sections are also characterized by a first and a second stop in order to move one or both of the external axes between a pivoted position and an unpivoted position.

For easier handling of the peeling apparatus, at least one but preferably exactly two handles can be arranged at the base body or the ring that can be moved relatively to the base body.

Handling and operation of the peeling apparatus is facilitated further if, when rotating the base body in a direction corresponding to removing material, the central axis and/or one or both of the external axes are moved into or in the pivoted position, and if, when rotating the base body into a direction opposite to removing material, the central axis and/or one or both of the external axes are moved into or in the unpivoted position.

For operationally safe positioning or pivoting of the central axis, the base body has passage openings through which the central axis and or one or both of the external axes are guided. These passage openings are characterized by a first opening section that is parallel to the longitudinal axis of the cylindrical body and transitions into a second opening section that is tangential—offset—in relation to the incircle but skewed in relation to the longitudinal axis of the cylindrical body. By configuring the opening sections accordingly, a limited movement, i.e., the limited pivoting of the axes, can be achieved.

An advantageous further development of the peeling apparatus provides that the external bearings are at least partially made from an elastically resilient material. Thereby, the external bearings can retreat when introducing the cylindrical body, allowing it to easily pass through the opening of the base body.

Advantageously, the external bearings may be made from the elastic material such that an introduced cylindrical body is biased. Hereby, there is no need for a complex adjustment mechanism for the external bearing, since the external bearing is made from the elastically resilient material that exerts mechanical pressure on the cylindrical body when that body is positioned concentrically in relation to the center of the incircle.

An example of the elastically resilient material is, for example, an elastomer such as vulcanized and, optionally, synthetically produced rubber. Alternatively, it is possible to use polyurethane or polypropylene elastomers. The elastically resilient material may have a Shore A hardness of between 30 and 80 SHA, or between 50 and 70 SHA. Harder elastomers that still can apply a sufficient bias to the cylindrical body have a Shore A hardness of between 80 and 90 SHA.

In order to be able to process cylindrical bodies of different diameters, it has also been shown to be advantageous if a blade that is inserted into a blade holder of the peeling apparatus is radially adjustable in relation to the incircle.

In this context, however, it has been shown to be particularly advantageous if a blade that is inserted into the blade holder is radially impinged with a spring in relation to the incircle. The spring presses the blade onto the external surface of the cylindrical body, such that, because of the bias of the spring, the removing of the external surface takes place automatically when the peeling apparatus is rotated, without the user having to apply additional radial pressure to the blade and onto the cylindrical body.

BRIEF DESCRIPTION OF THE SEVERAL VIEWS OF THE DRAWINGS

Further advantages, features and details of the invention arise from the claims, the following description of preferred embodiments and the drawings, in which:

DETAILED DESCRIPTION

The figures are showing embodiments of peeling apparatuses 100 characterized by a base body 102. This base body 102 is C-shaped and is characterized by two free ends 106, 108 forming between them a peripheral opening 104 through which an at least approximately cylindrical body, in particular, a cylindrical plastic tube can be inserted in order to subsequently remove at least part of the external circumferential surface of the tube with the peeling apparatus 100.

The base body 102 has an internal face 110 facing the cylindrical body. Furthermore, the base body 102 is characterized by a first lateral face 138 facing the viewer of the figures, and a second lateral face 140 parallel to the first lateral face 138. On its side facing away from the cylindrical body that is to be processed, the base body 102 has an external face 152 transitioning into the first end 106, depicted in the figures on the left on the one hand, and into the second end 108, depicted in the figures on the right, on the other hand. The internal face 110 as well transitions into the first end 106 and the second end 108. In order to fasten the peeling apparatus 100 securely to the cylindrical body that is to be processed, the free ends 106, 108 of the base body 102 are configured such that the base body 102 encloses the cylindrical body over an angle of more than 180 degrees. Advantageously, the base body 102 may enclose the cylindrical body over an angle of between 180 and 210 degrees.

A fictitious incircle 112 (FIG. 3 and FIG. 6) can be described by the C-shaped base body 102, in the illustrated embodiments by its internal face 110. In order to remove at least a part of an external circumferential surface of the cylindrical body, the cylindrical body is positioned or arranged concentrically to this—imaginary—incircle 112.

In order to reduce the bending stiffness of the base body 102 and to thereby facilitate applying of the peeling apparatus 100 to the cylindrical body that is to be processed, at least one recess 124 is formed on the internal face 110 that extends radially in relation to the incircle 112. In the illustrated embodiments, exactly two recesses 124 are provided at the base body 102 that are positioned symmetrically in relation to the free ends 106, 108. Each recess 124 may have a cross-section corresponding to a circular arc. Compared to the configuration of a recess 124 as a slit, this offers the advantage that the base body 102 does not tear due to a radius being too short in case of repeated elastic deformation of the base body 102 in the area of the recess 124.

Positioned at the first free end 106 is a first external bearing 114 and positioned at the second free end 108 is a second external bearing 116 that abut the cylindrical body when the cylindrical body is positioned concentrically in relation to the incircle 112. For this purpose, the external bearings 114, 116 extend beyond the incircle 112 towards the interior by a predetermined distance. This distance may, for example, be between 1.5 millimeters and 3 millimeters, or approximately 2 millimeters. In order to facilitate the insertion of a cylindrical body into the center of the peeling apparatus 100, the external bearings 114, 116 may be at least partially made from an elastically resilient material.

The insertion of the cylindrical body that is to be processed is thereby facilitated by the recesses 124 of the base body 102 on the one hand and by the external bearings 114, 116 being made from an elastically resilient material on the other hand. Advantageously, the cylindrical body that is to be processed can also be kept under bias in the peeling apparatus 100.

Positioned between the first free end 106 and the second free end 108 on the base body 102 is a central bearing 118 that is also in contact with the cylindrical body or the plastic tube during the peeling process, whereby the two external bearings 114, 116 and the central bearing 118 provide a three-point bearing for the cylindrical body that ensures operational safety. In the illustrated embodiments, the central bearing 118 is disposed between the two recesses 124 of the base body 102. The shown peeling apparatuses 100 have a central bearing 118 that is positioned at an equidistant distance from the free ends 106, 108 on the base body 102.

Figure 7:
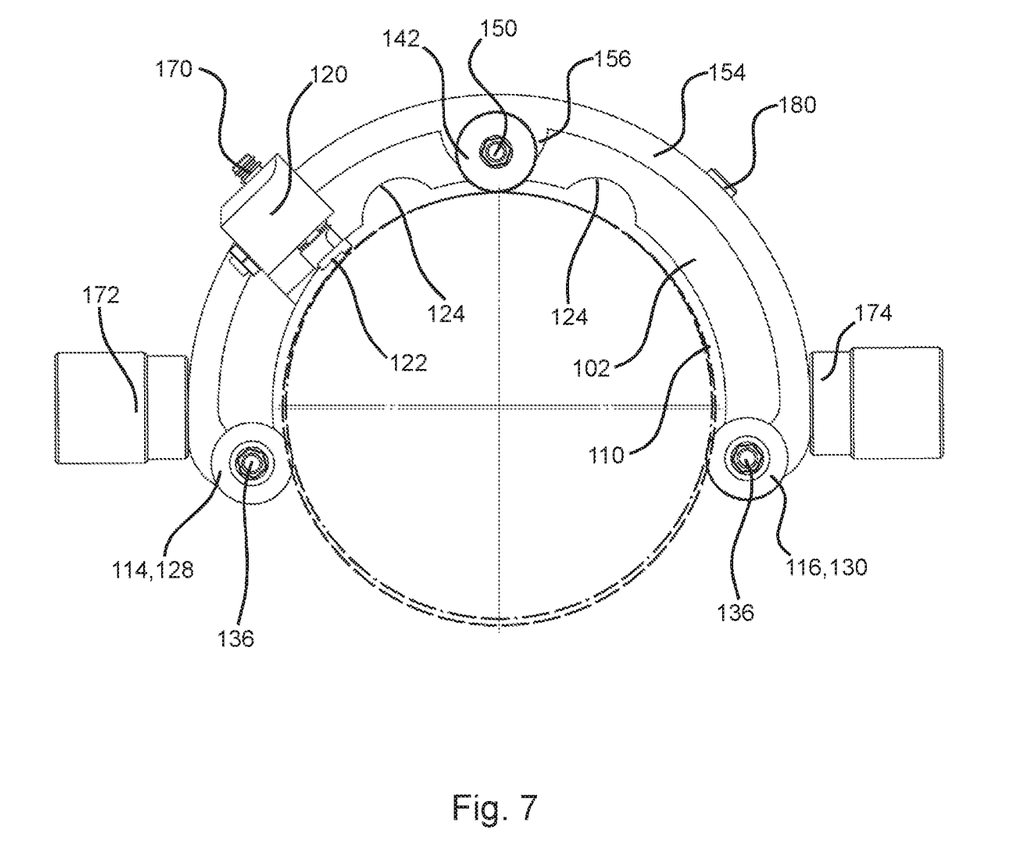
FIG. 7 is another side view of the peeling apparatus of FIG. 4 with illustrated circular movements of the external roller pairs and the central roller pair.

The central bearing 118 as well extends beyond the incircle 112 by a predetermined distance that may be shorter than the distance by which the external bearings 114, 116 extend beyond the incircle 112. The central bearing 118 may extend, for example, between 0.5 millimeters and 1.5 millimeters beyond the incircle 112, or by approximately 1 millimeter. The external bearings 114, 116 therefore execute an almost circular motion with a radius shorter than that of the circular motion of the central bearing 118, as shown in FIG. 7 as an example.

A blade holder 120 that is attached laterally to one of the two lateral faces 138, 140, in the illustrated embodiments to the first lateral face 138, is also disposed in the base body 102. A blade 122 that also extends beyond the incircle 112 defined by the internal face 110 of the base body 102 is clamped into this blade holder 120. This blade 122 therefore can contact the external surface of an at least cylindrical body, in particular, of a cylindrical plastic tube, at least at times, and therefore can remove or peel that external surface.

In the illustrated embodiments, the blade 122 is impinged with a spring 170 that with its spring force presses the blade 122 into a position that is substantially radial to the incircle 112 onto the external circumferential surface of a cylindrical body; this in particular when the peeling apparatuses 100 are twisted in a direction 162 corresponding to the peeling of the external circumferential surface (herein clockwise). When rotating the peeling apparatuses 100 into the opposite direction 164, the blade 122 is pressed back against the spring force of the spring 170 by the external circumferential surface, wherein the cylindrical body is not subject to material removal or peeling.

Figure 3:
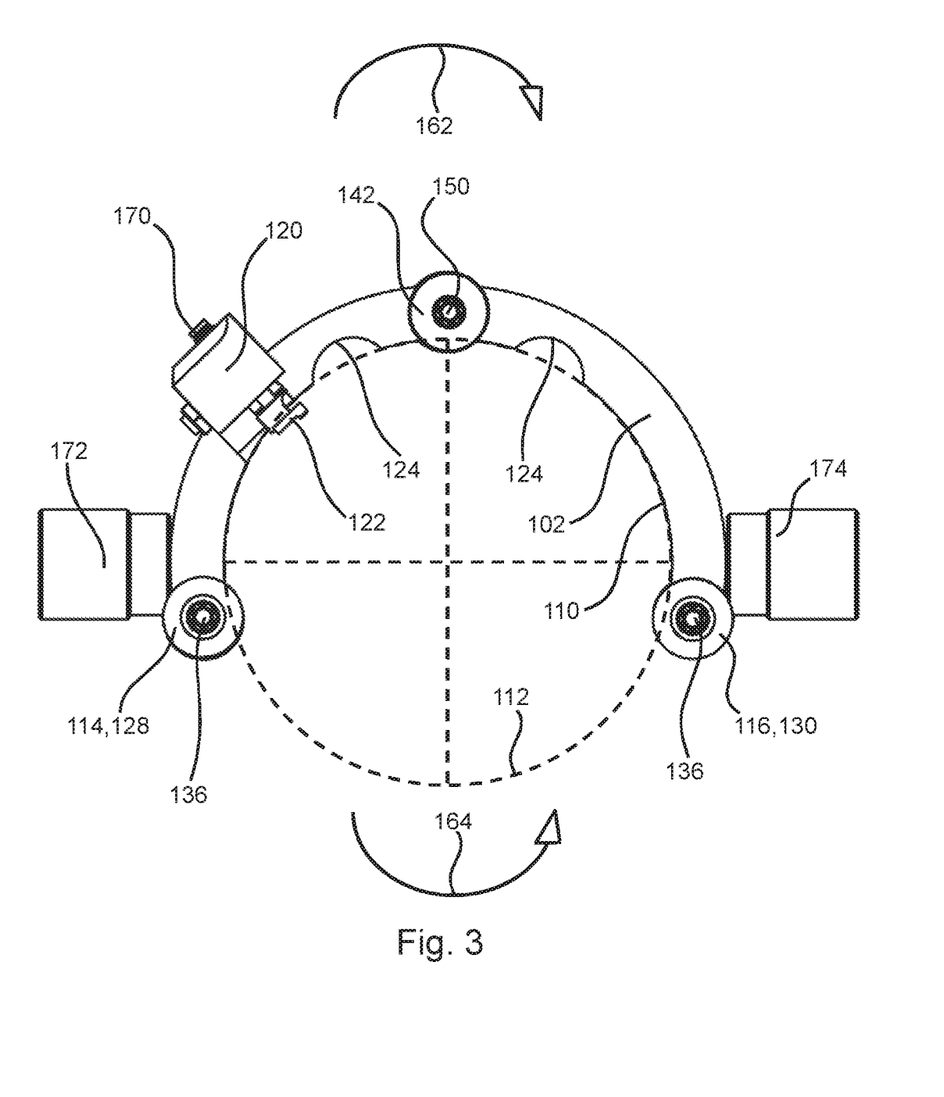
FIG. 3 is a side view of the peeling apparatus of FIG. 1.
Figure 4:
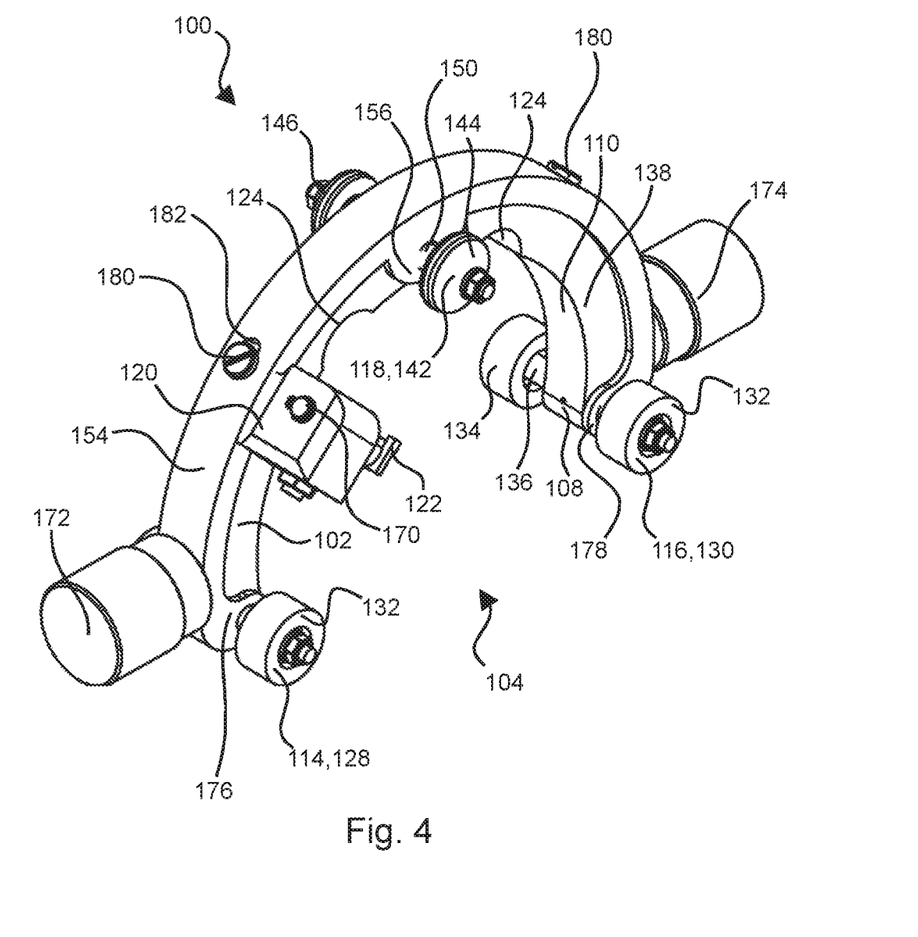
FIG. 4 a perspective representation of a peeling apparatus according to another embodiment.
Figure 5:
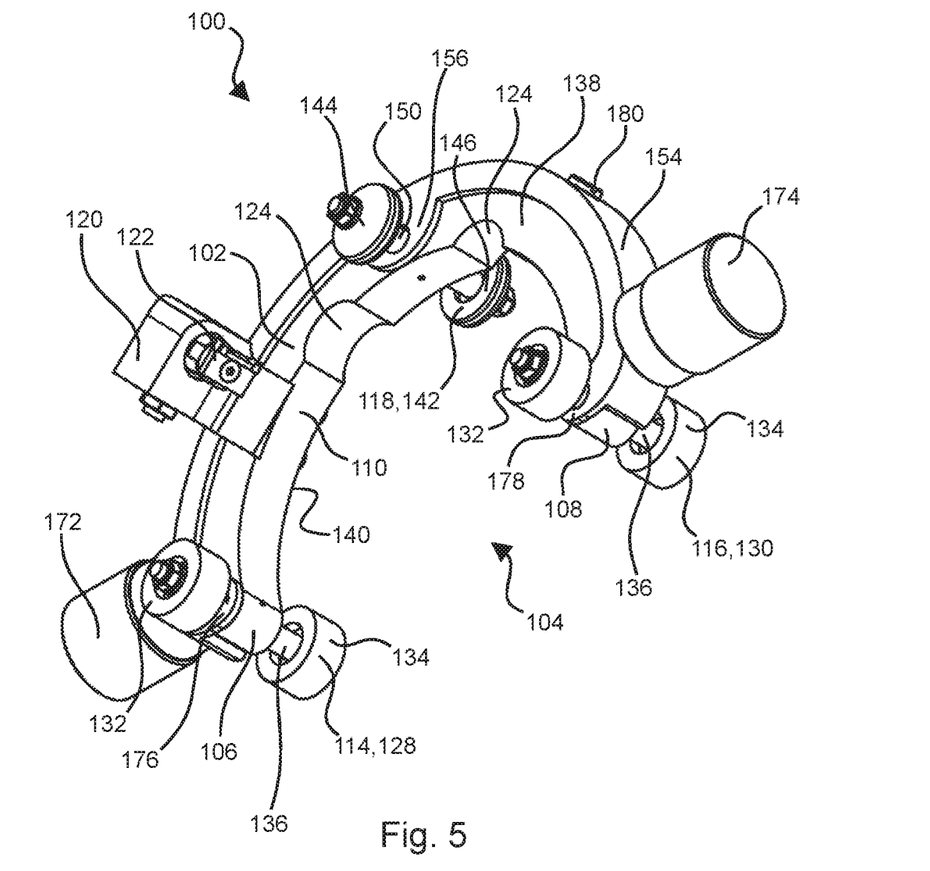
FIG. 5 is another perspective representation of the peeling apparatus of FIG. 4.
Figure 6:
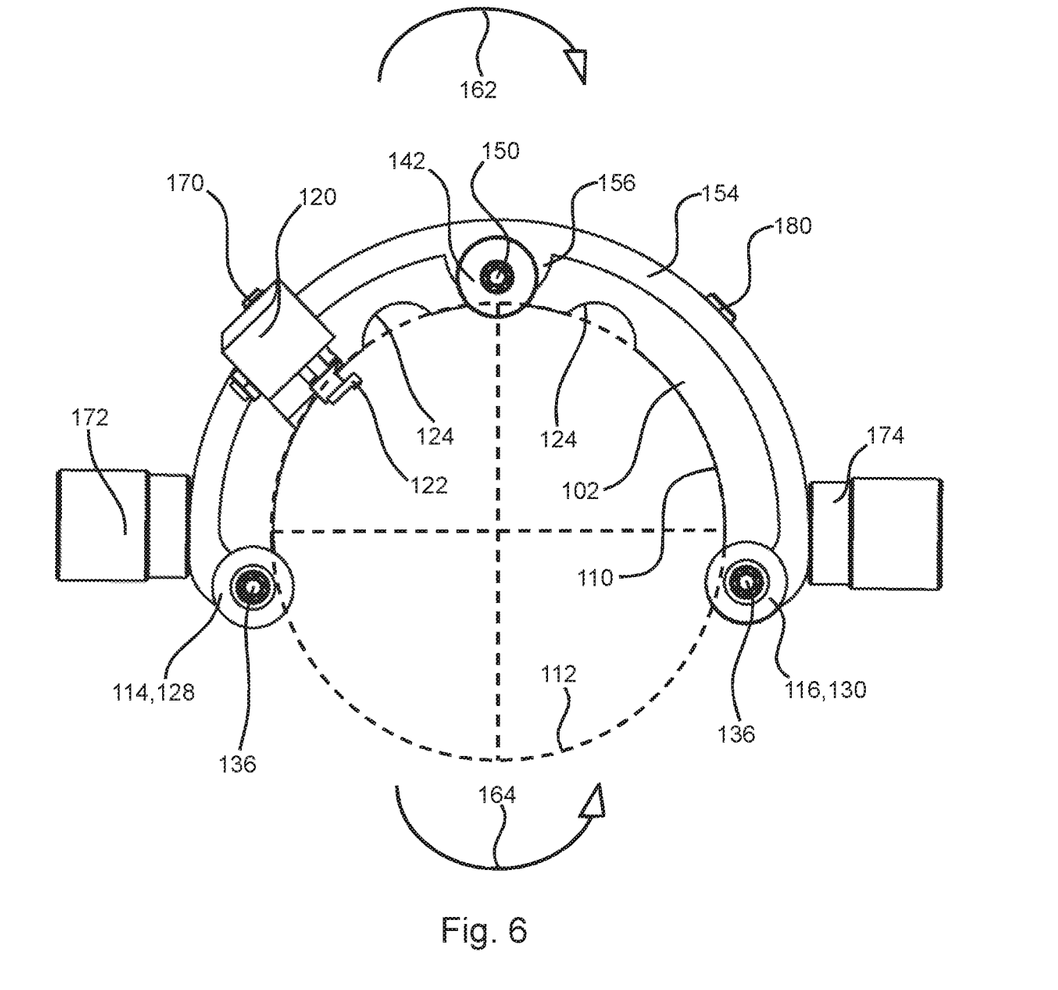
FIG. 6 is a side view of the peeling apparatus of FIG. 4.

In order to facilitate rotating the peeling apparatuses 100 for the user, in the illustrated embodiments, a first handle 172 (on the left) and a second handle 174 (on the right) are provided. In the illustrated embodiments, these are positioned opposite each other and thereby—in relation to the incircle 112—span an angle of about 180 degrees between them (FIG. 3 and FIG. 6). It is possible to use only one or more than two handles 172, 174.

In the peeling apparatuses 100 shown in the figures, the first external bearing 114 is formed by a first external roller pair 128 that is rotatably mounted on an external axis 136. Furthermore, the second external bearing 116 is formed by a second external roller pair 130 that is also rotatably mounted on an external axis 136. Each external roller pair 128, 130 has a first external roller 132 facing the viewer of the figure and a second external roller 134 facing away from the viewer of the figure. The first external roller 132 is positioned laterally to the lateral face 138 of the base body 102. The second external roller 134 is positioned laterally to the lateral face 140 of the base body 102. The external axes 136 are positioned or fitted into passage openings 148 (FIG. 9 and FIG. 11) of the base body 102 which extend from the first lateral face 138 through the base body 102 to the second lateral face 140. The external axes 136 provide threaded parts or sections at each end onto which may be screwed a self-locking nut to affix the external rollers 132, 134.

In the illustrated embodiments, the external rollers 132, 134 are formed by (soft) rubber wheels the tires of which are therefore formed from the elastically resilient material. In the peeling apparatuses 100 shown, the external rollers 132, 134 are designed as barrels or are barrel-like and therefore have a substantially consistent radius along their length.

Furthermore, the central bearing 118 in the illustrated embodiments is configured as a central roller pair 142 that is also mounted in or fitted into a passage opening 148 of the base body 102 along a central axis 150. The passage opening 148 in the illustrated embodiments also extends from the first lateral face 138 of the base body 102 to the second lateral face 140. The central axis 150 also provides threaded parts or sections at each end onto which may be screwed a self-locking nut to secure a first central roller 144, located at the front in the drawing, and to secure a second central roller 146, located at the back in the drawing, to the central axis 150. The first central roller 144 is positioned laterally to the first lateral face 138 of the base body 102. The second central roller 146 is positioned laterally to the second lateral face 140 of the base body 102.

The central rollers 144, 146, in particular the tires of their wheels, are preferably made from a (rigid) plastic that exhibits a lower elasticity than the elastically resilient material of the external bearings 114, 116. In other words, these have a higher Shore A hardness, i.e., a Shore A hardness exceeding 90 SHA. For example, the material of the central bearing 118 can be selected from one of the group including PE-LD, PE-HD, PP, PA66, POM, etc. The central rollers 144, 146 may have a decreasing diameter on the side facing away from the base body 102, i.e., they may be conical.

The central axis 150 and/or one or both of the external axes 136 are pivotably mounted around a predetermined angle tangentially in relation to the incircle 112. This pivotability facilitates advancement of the peeling apparatus 100 in axial direction of the cylindrical body when removing its external circumferential surface.

When rotating the base body 102 into a direction 162 corresponding to peeling, one or a plurality, preferably all of the axes 150, 136 are moved into a pivoted position, corresponding to an advancement configuration of the peeling apparatus 100. In this configuration, the longitudinal axis of the respective axis 150, 136 is skewed in relation to the longitudinal axis of the cylindrical body.

When rotating the base body 102 into a direction 164 opposite to peeling, one or a plurality, preferably all of the axes 150, 136 are moved to or returned to their unpivoted position, corresponding to a retracting configuration of the peeling apparatus 100. In this configuration, the longitudinal axis of the axis in question 150, 136 is substantially parallel in relation to the longitudinal axis of the cylindrical body.

Figure 8:
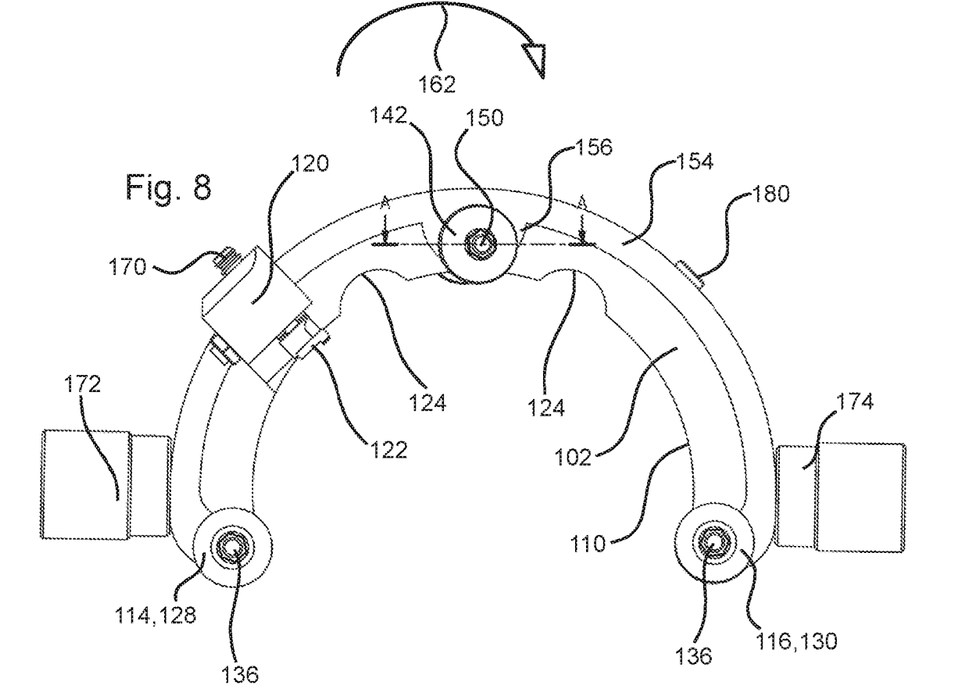
FIG. 8 is another side view of the peeling apparatus of FIG. 4 in a configuration corresponding to the advancing of the apparatus.
Figure 9:
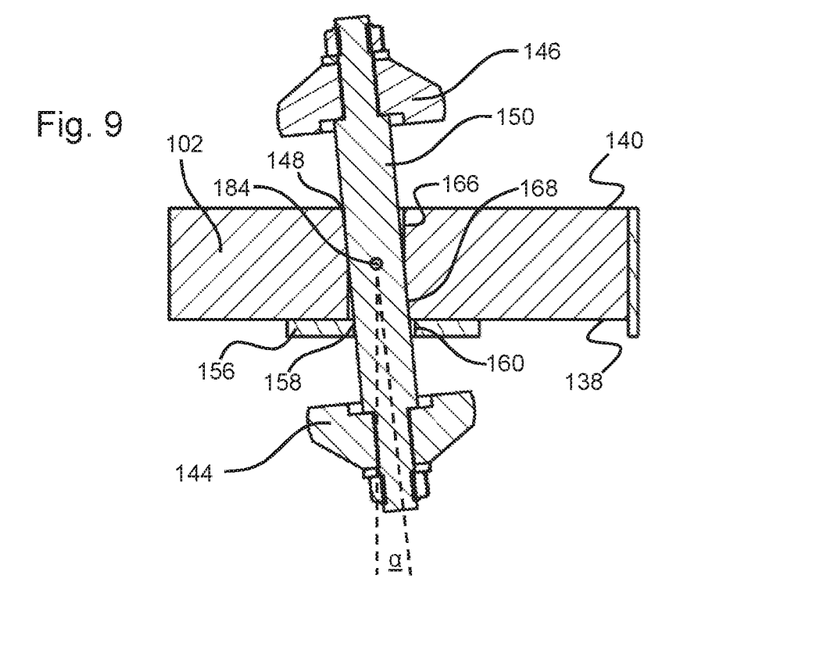
FIG. 9 is the cross-section A-A of FIG. 8.
Figure 10:
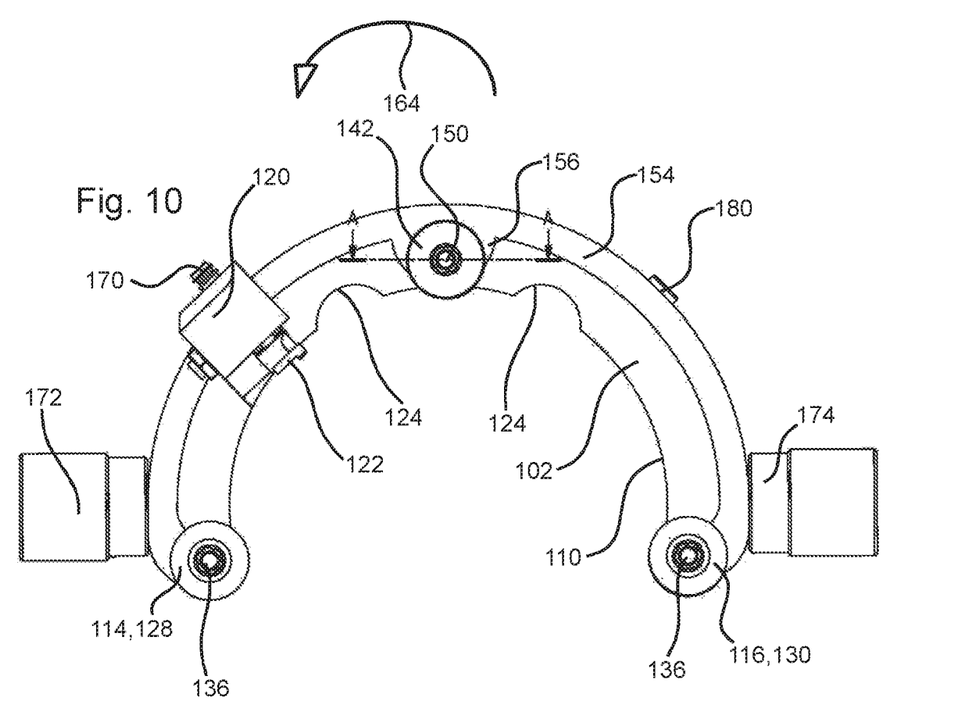
FIG. 10 is another side view of the peeling apparatus of FIG. 4 in a configuration corresponding to retracting the apparatus.
Figure 11:
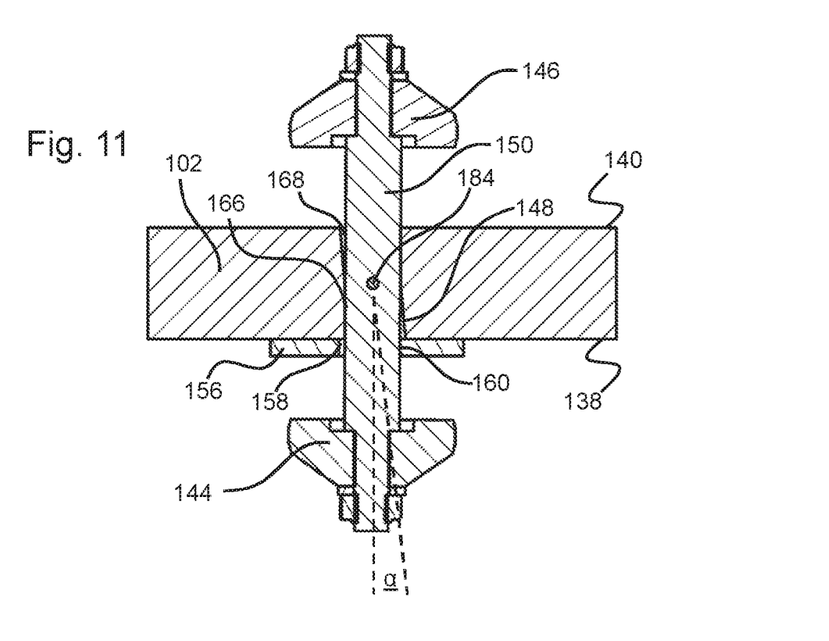
FIG. 11 is the cross-section A-A of FIG. 10.

The pivotability of one or a plurality of the axes 150, 136 is described below—only as an example—in connection with the central axis 150 using the FIGS. 8 to 11. FIGS. 8 and 9 show the central axis 150 in the pivoted position, with FIGS. 10 and 11 showing the central axis 150 in its unpivoted position. Even though only the pivotability of the central axis 150 can be seen in these figures, it should be noted that alternatively or additionally, also one or both of the external axes 136 can analogously be mounted pivotably in the respective passage opening 148 of the base body 102.

The passage opening 148, in which the central axis 150 is mounted to a pivot bearing 184, in particular a pin, is characterized by a first opening section 166 that transitions into a second opening section 168. The first opening section 166 is substantially parallel to the longitudinal axis of the cylindrical body. The second opening section 168 is a tangent—offset—in relation to the incircle 112 but skewed in relation to the longitudinal axis of the cylindrical body.

In the illustrated embodiment, the passage opening 148 is substantially point-symmetrical in relation to the central pivot bearing 184 of the central axis 150 or in relation to the pin. Because of this symmetry the first opening section 166 and also the second opening section 168 are provided twice in the through-hole 148.

In the pivoted position of the central axis 150, the central axis 150 abuts the second opening section 168 (FIG. 9). In the unpivoted position of the central axis 150, the central axis 150 abuts the first opening section 166 (FIG. 11).

When advancing the peeling apparatus 100, the central axis 150 is therefore rotated by a set angle α and returns to its original position when retracting the peeling apparatus 100. The user therefore does not need to peel a full rotation and can still achieve an advancement along the longitudinal axis of the cylindrical body that is to be processed.

The angle α by which the central axis 150 can pivot depends on the dimensions of the cylindrical body that is to be processed and on the width of the blade 122. The following applies to the angle α: α=arctan (width of the blade 122/circumference of the cylindrical body) or tan(a)=width of the blade 122/circumference of the cylindrical body.

Figure 1:
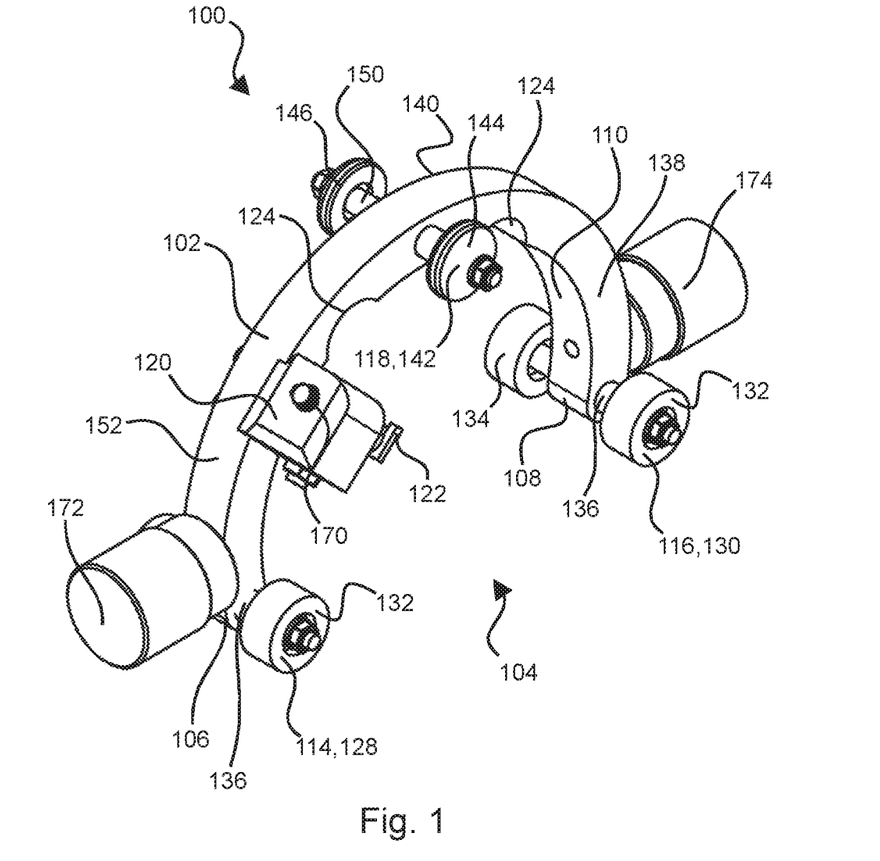
FIG. 1 is a perspective representation of a peeling apparatus according to one embodiment.
Figure 2:
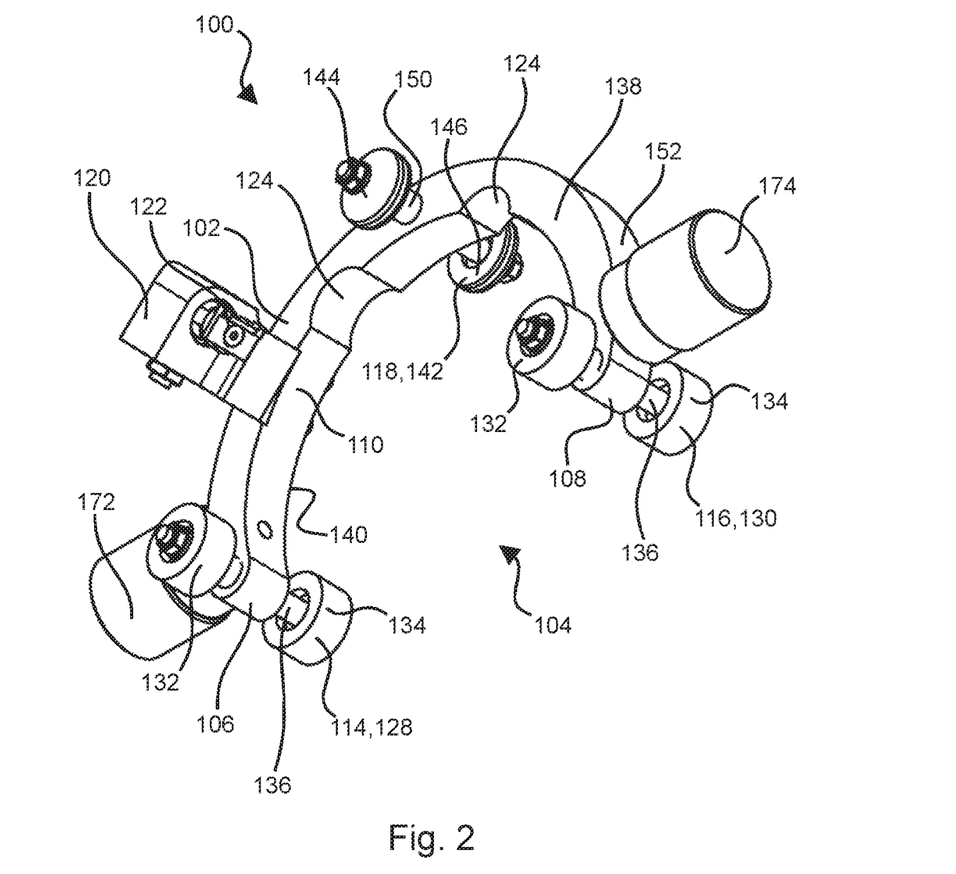
FIG. 2 is another perspective representation of the peeling apparatus of FIG. 1.

The peeling apparatus 100 according to the FIGS. 4 to 11 differs from the peeling apparatus according to the FIGS. 1 to 3 only by a ring 154 with limited movability in relation to the base body 102. While for the peeling apparatus 100 according to the FIGS. 1 to 3 the first handle 172 and the second handle 174 are directly fixed on the base body 102, the handles 172, 174 of the peeling apparatus 100 according to the FIGS. 4 to 11 are affixed to the ring 154.

The ring 154 has at least one, in the illustrated embodiment exactly two, oblong holes 182 through which is put the shaft of a screw 180 that is secured to the base body 102. Another number of oblong holes 182 with a screw 180 that is arranged therein is possible. The head of the screw 180 laterally extends beyond the oblong hole 182, the ring 154—with clearance—being mounted to the base body 102. The area in which the ring 154 is capable of limited movement in relation to the base body 102 can be defined by the oblong holes 182 and the respective screw 180 arranged therein. The guidance of the ring 154 is facilitated by its L-shaped cross-section, wherein a first branch at least partially extends along one of the lateral faces 138, 140, and a second branch at least partially extends along the external face 152.

Furthermore, the ring 154 is also characterized by a section 156 through which the central axis 150 is guided. This section 156—located at one of the lateral sides 138, 140—has a first stop 158 and a second stop 160 designed such that they move the central axis 150 between the pivoted and the unpivoted position. That means that when the ring 154 is pivoted in the direction 162 corresponding to peeling, the section 156 glides relative to the base body 102 until the first stop 158 comes into contact with the central axis 150 and until the central axis 150 is moved into its pivoted position (FIG. 9). When the ring 154 is pivoted in the opposite direction 164, the section 156 glides along the base body 102 until the second stop 160 comes into contact with the central axis 150 and until the central axis 150 is returned into its unpivoted position (FIG. 11).

Furthermore, the ring 154 has at one of its ends a first bearing section 176. Alternatively or additionally, the ring has at its other end a second bearing section 178. The external axes 136 are guided through recesses in the bearing sections 176, 178. These recesses can—analogously to section 156 of the central axis 150—also have stops 158, 160 that result in pivoting the external axes 136 when the ring 154 is moved in relation to the base body 102.

To conclude, it is pointed out that the rollers 132, 134, 144, 146 can be positioned at a distance to the base body 102; in particular in order to ensure a sufficient pivotability of the axes 150, 136. This distance provides safe moving of the central axis 150 and/or of one or both of the two external axes 136 between their pivoted and their unpivoted position.

The foreign patent application listed in the Application Data Sheet, namely, German utility model application DE 202018103392.1, filed Jun. 15, 2018, is incorporated herein by reference in its entirety. Aspects of the embodiments can be modified, if necessary, to employ concepts of the application to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A peeling apparatus for at least partially removing an external circumferential surface of an at least approximately cylindrical body, the peeling apparatus comprising:
   a C-shaped or C-like shaped base body having at least one recess in an internal face thereof and having two free ends for forming a peripheral opening, with the internal face transitioning into the free ends, the cylindrical body being insertable between the two free ends and being positionable concentrically in relation to a center of an incircle defined by the internal face of the base body;
   at least one external bearing arranged along a respective external axis at each of the free ends which abuts the cylindrical body when that body is positioned concentrically in relation to the center of the incircle;
   at least one central bearing that is on or attached to the base body, spaced apart from the free ends and positioned on a central axis; and
   a blade holder on or attached to the base body into which a blade is insertable so that the blade extends beyond the incircle defined by the internal face, the blade thereby, at least at times, being in contact with or removing the external circumferential surface of an inserted cylindrical body.

2. The peeling apparatus according to claim 1, wherein the central axis and/or one or both of the external axes are pivotably mounted tangentially around a predetermined angle in relation to the incircle.

3. The peeling apparatus according to claim 1, wherein the free ends of the base body are configured such that the base body encloses the cylindrical body or the incircle over an angle of more than 180 degrees.

4. The peeling apparatus according to claim 1, wherein the external bearings are formed by least one external roller that is rotatably mounted on the external axis.

5. The peeling apparatus according to claim 4, wherein the external bearings are formed by one external roller pair.

6. The peeling apparatus according to claim 4, wherein a first external roller is rotatably mounted laterally next to a first lateral face of the base body and wherein a second external roller is rotatably mounted laterally next to a second lateral face parallel to the first lateral face of the base body.

7. The peeling apparatus according to claim 6, wherein the external rollers extend beyond the free ends of the base body.

8. The peeling apparatus according to claim 1, wherein the central bearing is formed at or positioned on the base body at an equal distance from the free ends.

9. The peeling apparatus according to claim 1, wherein the central bearing is formed as a central roller pair with central rollers that are rotatably mounted on the central axis that is mounted in a passage opening of the base body.

10. The peeling apparatus according to claim 9, wherein a first one of the central rollers is rotatably mounted laterally next to a first lateral face of the base body and wherein a second one of the central rollers is rotatably mounted laterally next to a second lateral face parallel to the first lateral face.

11. The peeling apparatus according to claim 9, wherein the central rollers are formed to have a tapering diameter on a side facing away from the base body.

12. The peeling apparatus according to claim 1, wherein the central axis and/or one or both of the external axes are movable between a pivoted position corresponding to advancing the peeling apparatus and an unpivoted position corresponding to retracting the peeling apparatus.

13. The peeling apparatus according to claim 12, wherein a ring is positioned on an external face and/or a lateral face of the base body, the ring being, within limits, moveable in relation to the base body, wherein the ring has a section with stops and wherein the central axis can be moved between the pivoted and the unpivoted position using the stops.

14. The peeling apparatus according to claim 13, wherein the ring has at least one bearing section with stops through which one of the external axes is guided, and wherein the external axis guided through the bearing section can be moved between the pivoted and the unpivoted position using the stops.

15. The peeling apparatus according to claim 12, wherein the peeling apparatus is configured such that when rotating the base body in a rotational direction corresponding to peeling, the central axis and/or one or both of the external axes are moved into or are in the pivoted position and wherein when rotating the base body in a rotational direction opposite to peeling, the central axis and/or one or both of the external axes are moved into or are in the unpivoted position.

16. The peeling apparatus according to claim 1, wherein the base body has passage openings, with the central axis or one of the external axes guided through one passage opening each and wherein each passage opening has a first opening section that is parallel to a longitudinal axis of the cylindrical body and which transitions into a second opening section running tangentially in relation to the incircle but skewed in relation to the longitudinal axis of the cylindrical body.

17. The peeling apparatus according to claim 1, wherein the external bearings are at least partially formed from an elastically resilient material.

18. The peeling apparatus according to claim 1, further comprising a spring, and wherein the blade insertable into the blade holder is impinged radially in relation to the incircle by the spring.

* * * * *